March 29, 1949.　　　G. JOHNSTON　　　2,465,457
CONTROL FOR FLUID-PROPELLED AIRSHIPS
Filed July 31, 1944　　　3 Sheets-Sheet 1
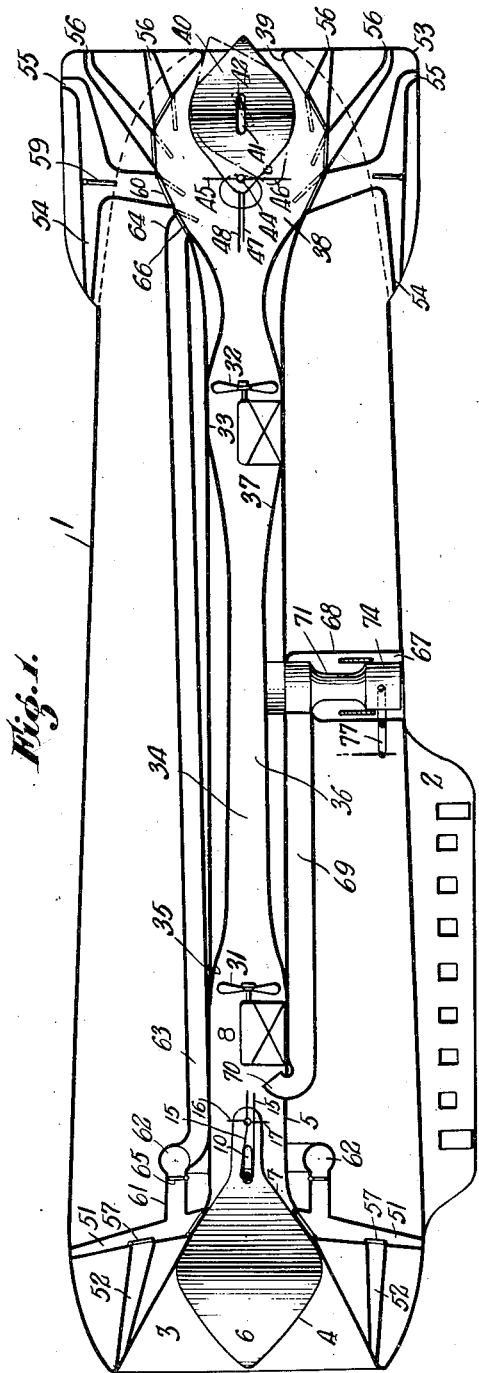
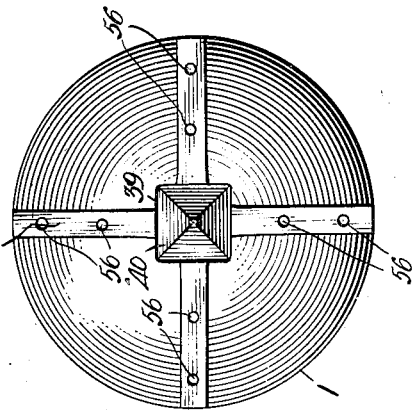
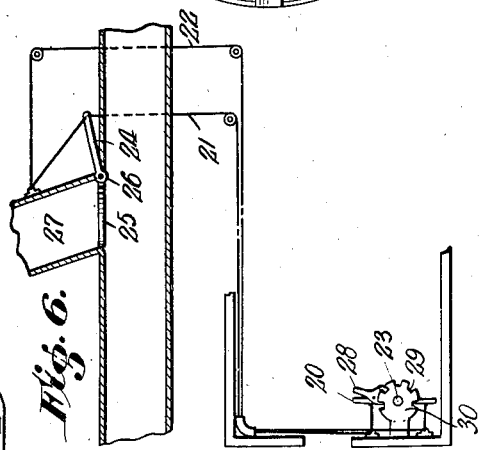
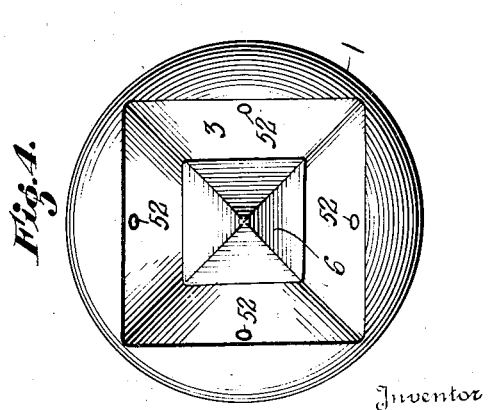
Inventor
GREENHOW JOHNSTON
By Geo. C. Shoemaker
Attorney March 29, 1949. G. JOHNSTON 2,465,457
CONTROL FOR FLUID-PROPELLED AIRSHIPS
Filed July 31, 1944 3 Sheets-Sheet 2
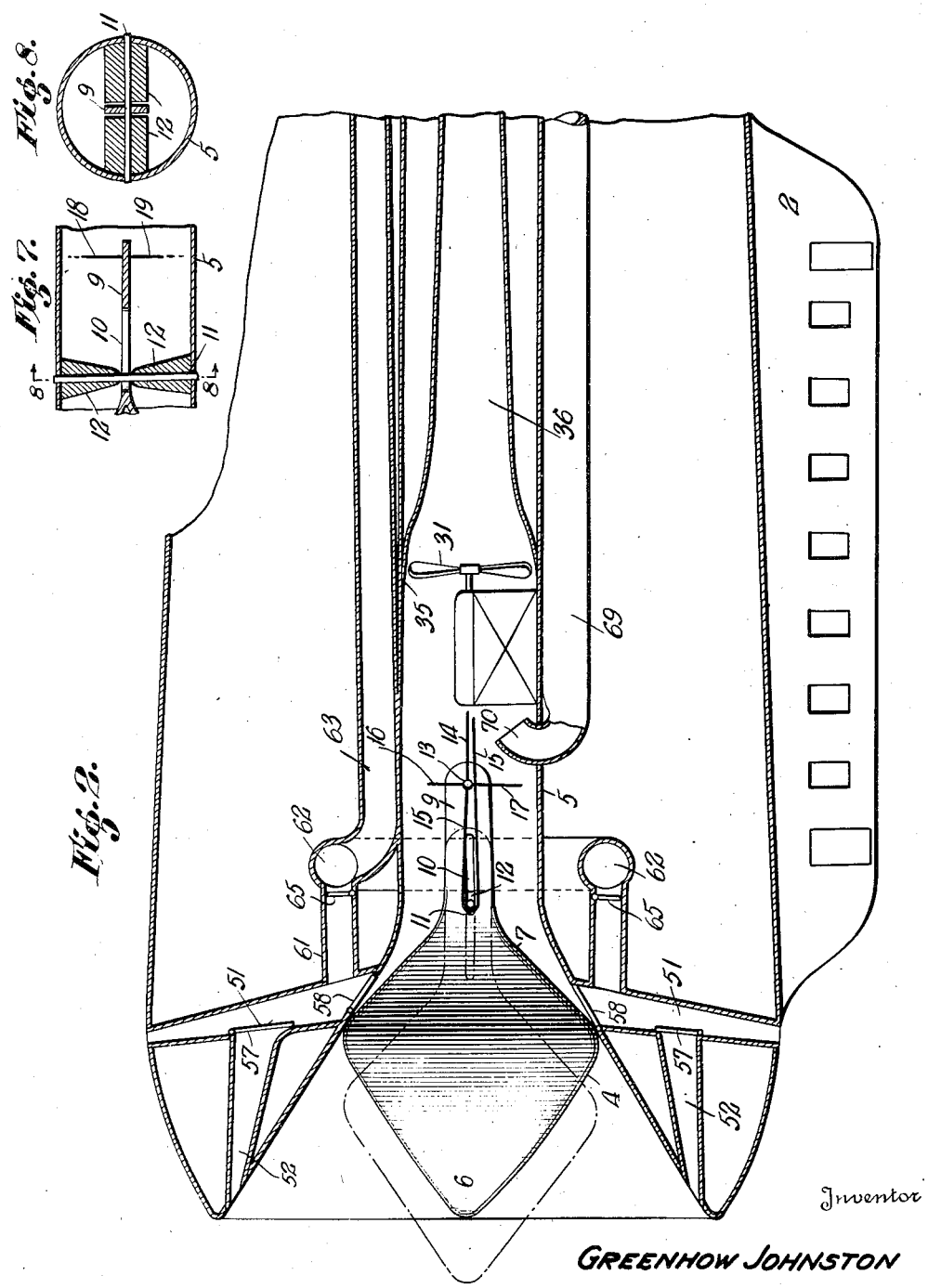
Inventor
GREENHOW JOHNSTON
By Geo. C. Shoemaker
Attorney March 29, 1949.　　　　G. JOHNSTON　　　　2,465,457
CONTROL FOR FLUID-PROPELLED AIRSHIPS
Filed July 31, 1944　　　　　　　　　　3 Sheets-Sheet 3
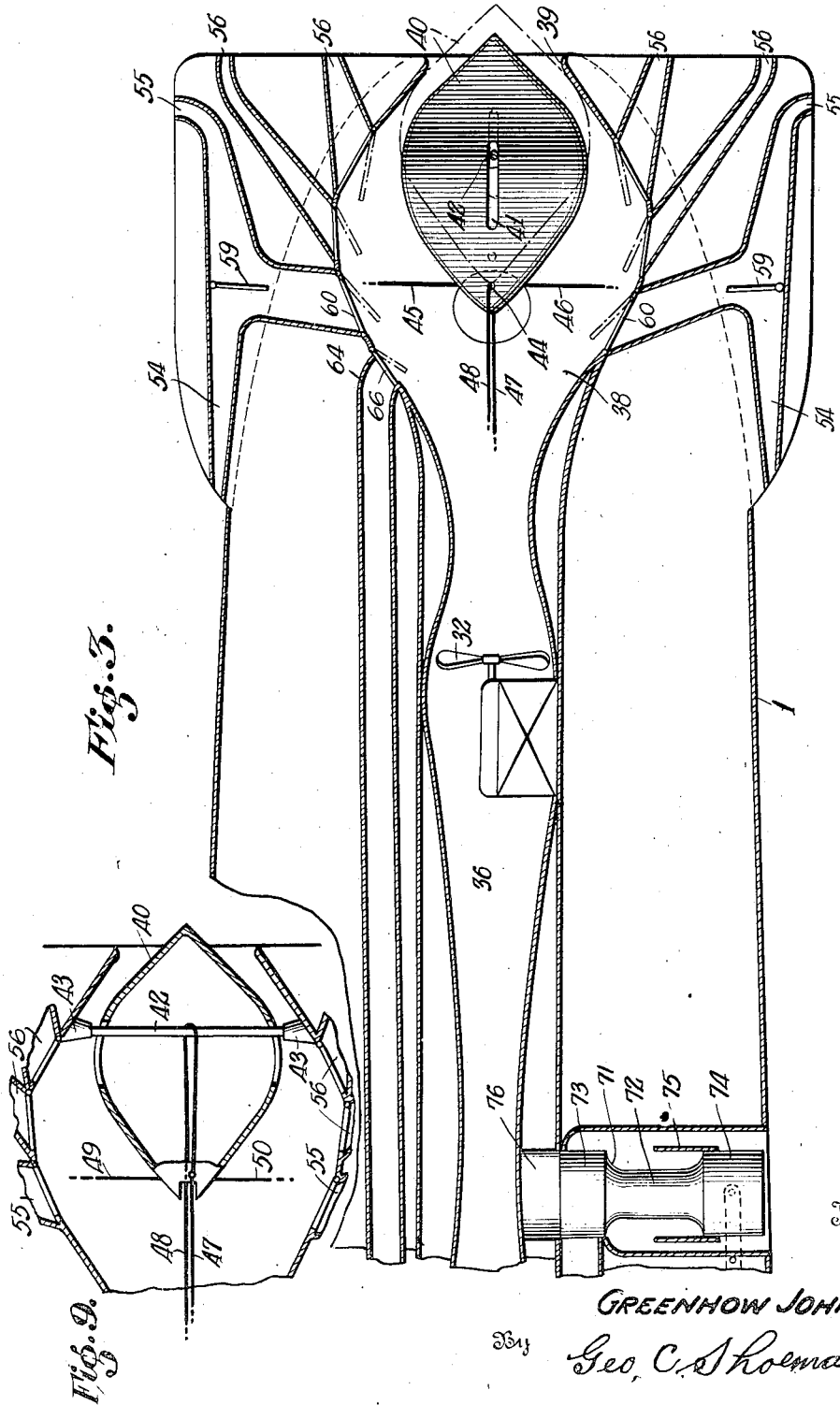
Inventor
GREENHOW JOHNSTON
By Geo. C. Shoemaker
Attorney Patented Mar. 29, 1949

2,465,457

UNITED STATES PATENT OFFICE 2,465,457

CONTROL FOR FLUID-PROPELLED AIRSHIPS

Greenhow Johnston, Richmond, Va.

Application July 31, 1944, Serial No. 547,465

20 Claims. (Cl. 244—52)

1

The invention relates to controls for airships.

An object of the present invention is to provide for lighter than air airships simple and effective means for controlling the speed and direction of an airship of the dirigible type adapted to regulate the speed, cause the airship to hover or stand still in mid-air, move up or down or sideways or backward and forward for maneuvering the same to any desired position and which will enable either end of the aircraft to be raised or lowered for pointing the aircraft upwardly or downwardly at an inclination.

A further object of the invention is to provide an aircraft having a buoyant body and provided at the front with a flaring entrance opening and having an air passage extending longitudinally of the aircraft from the entrance opening to the rear end thereof and equipped with valve means for controlling the amount of air passing through the air passage for regulating the speed and for entirely closing the entrance opening to form an air brake for checking the speed and for providing an air passage through the entrance opening at either the top, bottom or either side thereof for directional control of the aircraft.

Another object of the invention is to provide at the rear end of the air passage valve means similar in character to the valve means at the entrance opening adapted to regulate the amount of discharge of air from the rear end of the air passage and adjustable to form an air discharge passage either at the top, bottom or either side of the rear end of the passage for cooperating with the front valve means for directional and speed control of the airship.

It is also an object of the invention to provide an airship of the dirigible type provided with means cooperating with the valve means of the main air passage for discharging jets of air forwardly, rearwardly, upwardly, downwardly and laterally for raising, lowering, stopping and maneuvering the airship.

A further object of the invention is to provide an aircraft equipped with stabilizer fins, having jet passages arranged to discharge forwardly, backwardly, upwardly, downwardly and laterally with relation to the airship in the speed and directional control of the same.

Another object of the invention is to provide a valved inlet intermediate of the ends of the airship for the entrance of air into the main longitudinal passage when the nose and tail valve means of such passage are closed whereby the propellers operating within the main air passage are adapted to function for enabling directional

2 and speed control of the airship to be effected entirely through the jet action.

With these and other objects in view, the invention consists in the novel construction, arrangement, and combination of parts hereinafter fully described, illustrated in the accompanying drawings, and pointed out in the claims hereto appended, it being understood that various changes in the form, proportion, and minor details of construction may be resorted to without departing from the spirit or sacrificing any of the advantages of the invention.

In the drawings:

Fig. 1 is a diagrammatic longitudinal sectional view of an airship provided with control means constructed in accordance with the present invention.

Fig. 2 is an enlarged longitudinal sectional view of the front portion of the airship.

Fig. 3 is a similar view of the rear portion of the airship.

Fig. 4 is a front end view showing a flaring front entrance opening rectangularly in cross section.

Fig. 5 is a rear end view of the airship.

Fig. 6 is a detailed sectional view showing one of the hinged valves and the operating means therefor.

Fig. 7 is a detailed sectional view illustrating the manner of mounting the front or nose speed and directional control valve.

Fig. 8 is a detailed sectional view taken on the line 8—8 of Fig. 7.

Fig. 9 is a detailed sectional view of the rear portion of the airship showing the rear control valve and the means for operating the same.

In the accompanying drawings in which is illustrated one embodiment of the invention 1 designates a buoyant body designed to contain a gaseous lifting medium, such as helium, and having an envelope, skin or bag constructed of aluminum or any other suitable material and tapered longitudinally and having the conventional cylindrical form. Any suitable framework may be employed for supporting the skin or envelope and a showing of the framework is omitted for convenience of illustration. The buoyant body may be of any desired dimensions and is provided at the bottom with a control car or cabin 2 which is preferably located at the bottom front portion of the airship, as clearly illustrated in Figs. 1 and 2 of the drawings.

The front end of the body is provided with a flaring entrance opening 3 which, as clearly illustrated in Fig. 4 of the drawings, is rectangular, but a flaring opening of annular or any other configuration may be employed if desired, as will be readily understood. The flaring, rectangular entrance opening is believed to have advantages over other forms in that it presents inclined plane surfaces at the top and bottom and angularly disposed plane surfaces at the sides to cooperate with a front speed and directional controlling valve 4 which is mounted for backward and forward sliding movement for regulating the speed of the airship and which has pivotal upward and downward and lateral movement for directional control of the airship.

A central longitudinal or axially disposed tube 5 is connected at its front end to the flaring entrance opening and it forms a main air passage which extends from the front entrance opening to the rear end of the airship. The speed and directional control valve 4, which may be constructed of any suitable material, is rectangular in cross section and has tapered front and rear substantially pyramidal portions 6 and 7. The maximum transverse diameter is located at the juncture of the forwardly and rearwardly tapered portions of the speed and directional control valve which is adapted to abut against the walls of the flaring front entrance, as illustrated in full lines in Figs. 1 and 2 of the drawings, for completely closing the front flaring entrance or a portion thereof for excluding air from the main air passage 8 formed by the central longitudinal tube 5. The complete closing of the front or nose valve 4 prevents air from entering the main air passage and has the effect of an air brake in retarding the forward movement of the airship. The front or nose valve is slidable longitudinally of the airship from the full closed position shown in Figs. 1 and 2 to a full open position illustrated in dotted lines in Fig. 2 of the drawings and the said nose valve is also adapted to be swung upwardly or downwardly from the dotted line position shown in Fig. 2 or any intermediate open position to provide an air channel or passage at the top or bottom of the entrance opening and to be swung laterally to provide an air passage at either side of the flaring entrance opening. Providing such an air passage will cause the current of air passing through the entrance opening to impinge against one of the four walls of the flaring entrance opening and if the air enters only at the top of the flaring entrance opening it will urge the front end of the airship upwardly, and if the entrance of the air is at the bottom of the flaring entrance opening, the current of air will tend to move the front end of the airship downwardly. In the same manner, if the air enters only at one side of the flaring entrance opening, the front end of the airship may be moved in the direction in which the air impinges against the exposed wall of the flaring entrance opening.

The front speed and directional control valve is provided at the rear or inner end with a stem 9 provided at its front portion with a longitudinal slot 10 through which passes a horizontal pivot rod 11. The stem is maintained centrally of the pivot rod 11 by means of spacing and fulcrum blocks or members 12 mounted on the pivot rod 11 and tapered towards the stem 9. The slot 10 permits forward and backward sliding movement of the nose valve 4 and also upward and downward pivotal movement and the tapered spacing members 12 each form a fulcrum for the stem to permit lateral pivotal movement of the nose valve.

The nose valve may be operated in its various movements by any suitable means. One convenient and satisfactory means for operating the nose valve comprises a plurality of flexible cables or lines of any suitable material and connected to the stem 9 at an opening 13 thereof. One line 14 extends rearwardly from the stem for moving the nose valve inwardly or rearwardly. Another line 15 extends forwardly from the opening 13 and is trained around the pivot 11 and is extended rearwardly. Lines 16 and 17 extend upwardly and downwardly from the valve stem and lines 18 and 19 extend laterally from the valve stem as clearly illustrated in Fig. 7 of the drawings. The lines are designed to extend over suitable guiding means to the control cabin or car 2 to suitable operating levers which are designed to be provided for each of the valves controlling the passage of air in the airship. In Fig. 6 of the drawing is illustrated one of the operating means consisting of a pivoted lever 20 to which are connected flexible lines or cables 21 and 22 secured to the lever 20 at opposite sides of the fulcrum point 23 thereof and extending to an arm 24 of a valve 25 hinged or pivoted at 26 and adapted to control the passage of air to a duct 27. The arm 24 extends from the pivot in the opposite direction from the valve and the line 21 extends downwardly from the arm 24 and is trained over suitable guides and led to the operating lever 20. The other line 22 extends upwardly from the arm of the valve and is led over suitable guides to the lever 20, the two lines 21 and 22 being connected to the lever at opposite sides of the pivotal point 23 of said lever. The lever is equipped with a locking pawl 28 which is arranged to engage an arcuate series of recesses 29 formed in a disk 30 located at one side of the operating lever 20. When the operating lever 20 is swung in one direction, one of the lines 21 and 22 is pulled and the arm 24 of the valve is positively swung in one direction and when the lever is moved in the other direction the arm 24 of the valve is correspondingly actuated. This will enable the hinged valve 25 to be opened and closed and adjusted to the desired degree. Any other suitable ratchet-making mechanism may be provided for locking the lever 20 and any other suitable operating means may, of course, be employed for controlling the valve 25. A similar operating mechanism is designed to be provided for each of the lines of the front nose valve and to be arranged in convenient position so that the controls may be operated by one person.

The propelling means which may include any desired number of propellers is illustrated in the drawings comprising a front propeller 31 and a rear propeller 32. The front propeller 31 is located within the front portion of the central longitudinal tube 5 and the rear propeller is located at the rear portion of the airship within an enlarged intermediate portion 33 of an auxiliary air tube 34. The auxiliary air tube 34 is provided with a flared front end 35, which is connected to the main air tube 5 at a point adjacent to the front propeller 31. The flaring rearwardly of the tapered front end 35 of the auxiliary tube forms a reduced front portion 36 which has a flaring rear end 37, located adjacent to and in advance of the rear propeller 32 and formed by the enlargment or enlarged portion 33 of the auxiliary tube. The reduction of the auxiliary tube between the flared portion 35 and 37 results in a venturi effect on the slip stream of the front propeller and the velocity and density of the air delivered to the rear propeller.

The intermediate enlarged portion 33 of the auxiliary tube contains the rear propeller and its reduced rear end merges into an enlarged oppositely tapered rear terminal portion 38 of the auxiliary tube. The enlarged portion 38 of the auxiliary tube tapers forwardly and rearwardly and is provided at the rear end with an opening 39 through which air is discharged. As recently illustrated in Fig. 5 of the drawing, the opening 39 is rectangular and the enlarged rear portion 38 of the auxiliary tube is rectangular in cross sections and provides at its rearwardly tapered portion, upper and lower inclined plane surfaces and angularly disposed plane rear conversion side surfaces.

Within the enlarged rear portion 38 of the auxiliary tube is arranged a rear speed and direction control valve 40, which is of substantially the same form as the front nose valve 4, and which cooperates with the tapered rear portion of the rear enlargement in the same manner as the front speed and direction valve 4 cooperates with the walls or surfaces of the flaring entrance opening 3 to regulate the discharge of air through the rear opening or outlet 39 and also to form an air passage at either side of the speed and direction control valve 40. This will enable the rear speed and direction control valve 40 to cooperate with the front speed and direction control valve 4 for regulating the entrance of air into the longitudinal passage and for controlling discharge of air therefrom, and also from preventing the entrance of air into the longitudinal air passage from the front end of the airship, and the discharge of air through opening 39, to form an air brake and also to provide cooperating passages at the top and bottom or side of the front and rear valves 4 and 40 for controlling the direction of the airship and for raising or lowering the ends of same.

The oppositely tapered rear speed and direction control valve, which is rectangular in cross sections is provided at its center with a longitudinal slot 41, through which passes a horizontal rod 42, forming a pivot for the rear valve 40. The slot and pivot permit the rear valve to swing upwardly and downwardly and fulcrum blocks 43, arranged on the pivot 42 at opposite sides of the rear valve 40, space the rear valve from the side wall of the enlarged portion 38 of the auxiliary air tube and permit a lateral pivotal or swinging movement of the rear valve. This control permits the rear valve 40 to have all the movement necessary for it to cooperate with the front valve 4.

The rear valve 40 is operated and adjusted by flexible cable or lines in substantially the same manner as the front valve. The lines are attached to the rear valve at the front portion thereof at 44. Lines 45 and 46 extend upwardly and downwardly from the rear valve, a line 47 extends forwardly from the rear valve for moving the rear valve forwardly and a line 48 extends rearwardly from the point 44 of attachment and is trained around the pivot rod 44, and then extended forwardly. The lines 47 and 48 are adapted to moving the rear valve either forwardly or rearwardly, the same as the lines 14 and 15 of the front valve. Side lines 49 and 50 extend from the front portion of the rear valve and are adapted to swing the same horizontally on the fulcrum blocks 43, while the said lines 45 and 46 effect and operate a downward and upward swinging movement of the rear portion of the rear valve 40. The lines are designed to extend over suitable guiding means to operating levers located within the control cabin 2. These levers are the same as operating lever 20 heretofore described, and as any means may be employed for sliding the rear valve backward and forward and for effecting upward and downward and lateral swinging movement of the rear portion of the rear valve, further description and illustration of such operating means is deemed unnecessary.

The tapered front portions of the front valve 4 and the rear valve 40 operate as air deflectors and when the valves are open and arranged in a central position with relation to the longitudinal axis of the bouyant body they divide and deflect the air so that the divided currents of air impinge equally against the walls of the enlarged entrance opening in the front end of the bouyant body and against the walls of the rear portion of the rear enlargement of the longitudinal passage and thereby operate to steady the airship. Also when the front and rear valves are swung either up and down or lateral to provide a single passage for the air entering the body at the front end thereof, and leaving the body at the rear end of the same, the front portion of the front and rear valve serves as air deflectors by directing the currents of air through such single inlet passages and outlet or discharge passages. The front and rear valves are adjustable or operable to cooperate with each other in controlling or regulating the speed of the airship and also in guiding or changing the direction of the same. When both valves are open and it is desired to lower the front end of the airship, the front valve will be swung upwardly and the rear valve will be swung downwardly, thereby providing a single air passage for the body at the entrance opening 3 and the single passage at the top of the rear opening 39. The air entering the longitudinal passage will tend to depress the front end of the body and the air escaping from the rear opening 39, and impinging against the top wall or surface of the rear enlargement of the main air passage will tend to elevate the rear end of the body which is thereby adapted to turn or pivot on its central transverse axis. Corresponding adjustment on positioning of the front and rear valves 4 and 40 will produce corresponding movement of the airship which is maneuverable within a comparatively small area for starting, landing and various other purposes.

The front and rear valves 4 and 40 are also adapted to be moved rearwardly to the closed position to prevent passage of air through the main longitudinal air passage to form an air brake for checking the forward movement of the body of the airship, and for stopping the same to enable the airship to hover in midair. By partially closing the front and rear valves and reducing the size of the entrance and exit passages of the main air passage the speed of the airship may be reduced and the airship brought to a standstill without excessive strain on the same. When the airship has been brought to a standstill it is maneuverable, independent of the passage of air into the main air passage at the front entrance opening. For this purpose the front of the airship is provided with radially and longitudinally disposed valve controlled air jet passages 51 and 52. In the form of the invention illustrated in the accompanying drawing, four radially disposed air jets 51 and four longitudinally disposed air jets 52 are provided, but any desired number of air jets may be employed as is readily understood. The radially disposed air jet passages and the longitudinally disposed air jet passages are located at the top, bottom and sides of the body. When the air is discharged through the longitudinally disposed air jet passage it tends to move the body rearwardly and may be employed to cooperate with the front and rear valves 4 and 40 to provide air brakes for checking the forward movement of the body and stop the same. The air discharged from the radially disposed air jet passage tends to move the front end of the body upward, downward or laterally, in either sidewise direction and may be employed to assist in the guiding and controlling the airship by the front and rear valves with which the air jets are adapted to cooperate in the controlling of the airship in maneuvering the same.

The rear end of the buoyant body tapers rearwardly as clearly illustrated in dotted lines in Fig. 1 of the drawings and in solid lines in Fig. 5 of the drawings, and it is provided at the tapered rear end with stabilizer fins 53 which are provided with valve controlled air jet passages 54, 55 and 56. The air jet passage 54, extends longitudinally with relation to the body of the airship and discharges jets of air forwardly at the front edges of the fins and cooperates with the front longitudinal air jet passage 52 in effecting a rearwardly movement of the airship. The radially disposed air jet passages 55 which are arranged in the same relative position as the front radial air jet passage 51 and adapted to cooperate with the same in the control of the airship, both in conjunction with and independent of the front and rear valves 4 and 40. The air jet passages 56 are located at the rear edges of the stabilizer fins and a plurality of these air jet passages is provided and they are arranged in spaced relation to provide increased traction or propelling effect. While two rearwardly discharging air jet passages are provided in each of the stabilizer fins, any number of such passages may of course, be employed. All of the air jet passages are valve controlled preferably by hinged valves 57, 58, 59 and 60, which in practice will be provided with operating means substantially the same as that illustrated in Fig. 6 of the drawings, but instead of employing hinged valves any other desired form of valve may be used and any suitable operating means for the valves may be employed.

The front air jet passages 51 and 52 are connected with each other, and are also connected by branch ducts 61, with an annular duct 62, which is supplied with air from the main air passage by means of a longitudinal duct 63 extending rearwardly from the annular duct 62 to the rear enlargement of the main longitudinal air passage and its rear terminal 64, connected with the same. Front and rear hinged valves 65 and 66 control the passage of air through the branch ducts 61 and the longitudinal duct 63, while the longitudinal duct 63 is connected with the enlarged rear portion of the main air passage in order to obtain the air pressure and effect of both the front and rear propellers. It may, however, be connected with the main air passage at any other desired point.

When the front and rear valves 4 and 40 are closed air is supplied to the main longitudinal air passage through a radial entrance opening 67, formed by a transversely disposed tube 68 extending through the skin or envelope of the body to a point adjacent the main air passage and connected at its inner end with the same, by a forwardly extending longitudinal duct 69, having its front terminal 70 extended into the main air passage and discharging rearwardly therein at a point in advance of the front propeller 31, so that both the front and rear propellers will be supplied with air from the exterior of the airship. The passage of air through the air duct 69 is controlled by a valve 71, slidably mounted in the radial entrance opening 67 as clearly illustrated in Figs. 1 and 3 of the drawings. The slidable valve consists of a stem 72 and inner or outer heads 73 and 74.

When the valve 71 is in its closed position, its inner head 73 is located at the rear end of the air duct 69 and closes the same. The outer head of the valve 71 is guided by suitable guides 75, located within the tube 68 and a short tube 76, which is mounted within tube 5, is arranged to guide the inner head 73 of the valve in the sliding movement thereof. The valve 71 is actuated by a lever 77, fulcrumed at an intermediate point on the exterior of the tube 68 and pivotally connected at one end with the outer head 74 of the valve and having its other end with suitable lines for operating the slidable valve. The slidable valve may be located at any other desired point but it is in a convenient position at the rear end of the control cabin.

What is claimed is:

1. In an airship, a buoyant body having at the front a flaring entrance opening and provided with a continuous longitudinal air passage of less diameter than the entrance opening and extending rearwardly from the entrance opening through the body to the rear end of the same, and valve means located at the front end of the air passage in said entrance opening and consisting of a tapering plug and movable toward and from the longitudinal air passage to control the amount of air entering the air passage and to plug and close the air passage to form an air brake and also movable vertically and laterally to provide an air inlet at only the top, bottom or either side of the front end of the body for guiding and controlling the direction of the airship.

2. In an airship, a buoyant body having at the front a flaring entrance opening and provided with a continuous longitudinal air passage extending from the entrance opening through the body to the rear end of the same, and a front speed and direction control valve consisting of a tapering plug located in the entrance opening and movable to and from the walls of the entrance opening and toward and from the longitudinal air passage to control the amount of air entering the longitudinal passage and also to form only at the top, bottom or either side an air inlet.

3. In an airship, a buoyant body having at the front a flaring entrance opening and provided with a continuous longitudinal passage extending rearwardly from the entrance opening through the body to the rear end thereof, a front speed and direction control valve consisting of a tapering plug located in the entrance opening and having a rear tapered portion to cooperate with the walls of the entrance opening and movable toward and from the same and toward and from the longitudinal air passage for controlling the entrance of air to the longitudinal air passage and provided with a front tapered portion for dividing and deflecting the air entering the entrance opening, and means for mounting the valve for sliding and pivotal movements.

4. In an airship, a buoyant body having at the front an entrance opening and provided with a continuous longitudinal air passage extending rearwardly from the entrance opening through the body to the rear end of the same and provided with a rear outlet tapered rearwardly, a rear valve consisting of a plug located within the longitudinal passage and having a tapered portion and movable longitudinally in the air passage toward and from the rear outlet to control the amount of air discharged through the same and also to close the rear outlet to form an air brake, said valve being provided with a front tapered portion arranged to divide and deflect air passing through the longitudinal passage to the outlet, and means for mounting the rear valve by sliding and pivotal moving, whereby the rear valve is adapted to control the amount of air discharged through the rear outlet and also movable vertically and laterally toward and from the walls of the tapered outlet to form an air passage only at the top, bottom or either side of the body.

5. In an airship, a buoyant body having at the front a flaring entrance opening rectangular in cross section and presenting rearwardly converging plane surfaces at the top and sides of the body, said body being provided with a continuous longitudinal air passage entering rearwardly from the entrance opening through the body to the rear end of the same and provided thereat with an outlet, a front valve consisting of a plug located in the entrance opening and having a tapered portion rectangular in cross section and movable longitudinally toward and from the air passage and cooperating with the plane surfaces of the entrance opening to regulate the amount of air passing through the air passage and also to plug and close the same, said valve being also provided with a tapered front portion arranged to divide and deflect air entering the entrance opening, and means for mounting the valve for sliding and pivotal movements.

6. In an airship, a buoyant body having at the front an entrance opening and provided with a continuous longitudinal passage extending rearwardly through the body from the entrance opening to the rear end of the body and having thereat a rearwardly tapered portion rectangular in cross section and forming an outlet and presenting rear converging plane surfaces located at the top, bottom and sides of the body, and a rear valve consisting of a plug located within the longitudinal passage and having a rearwardly tapered portion rectangular in cross section and movable toward and from said plane surface to regulate the amount of air discharged through said outlet and also movable vertically and laterally toward and from said plane surfaces to provide an outlet located only at the top, bottom or either side of the body.

7. In an airship, a buoyant body having at the front an entrance opening and provided with a continuous longitudinal passage extending rearwardly through the body from the entrance opening to the rear end of the body and having thereat a rearwardly tapered portion rectangular in cross section and forming an outlet and presenting rear converging plane surfaces located at the top, bottom and sides of the body, and a rear valve consisting of a plug located within the longitudinal passage and having a rearwardly tapered portion rectangular in cross section and movable longitudinally and also vertically and laterally toward and from said plane surfaces to regulate the amount of air discharged through said outlet and to provide an outlet located only at the top, bottom or either side of the body, said valve being also provided with a tapered front portion rectangular in cross section and adapted to divide and deflect air passing through the longitudinal passage.

8. In an airship, a buoyant body having a front entrance opening and provided with a continuous main longitudinal air passage extending through the body from the front entrance opening to the rear end of the body and having an outlet thereat, front and rear valve means for controlling the entrance and exit of air from the longitudinal passages and for closing both ends of the air passage to form a pressure receiving chamber within the body, propelling means located within the air passage adapted also to produce air pressure within said chamber when the ends of the longitudinal passage are closed, front air jet passages arranged to discharge air jets forwardly from the front of the body and radially at the top, bottom and sides of the same, stabilizer fins located at the rear end of the body and provided with air jet passages arranged to discharge jets of air forwardly, radially and rearwardly, means for connecting the air jet passages with said pressure receiving chamber for supplying air under pressure to said jet passages, a valve controlled air entrance located intermediate of the ends of the body, and an air duct extending from said air entrance to the main air passage and arranged to discharge air into the same in advance of said propelling means.

9. In an airship, a buoyant body having a longitudinal opening for the passage of air extending rearwardly from the front end of the body to the rear end thereof and having a rearwardly tapered portion, valve means consisting of a plug located in the longitudinal opening and movable toward and from the rearwardly tapered portion thereof to control the amount of air passing through the longitudinal opening and to plug and close the same to form an air brake and movable vertically and laterally to provide an air passage at only the top, bottom or either side of the air passage, and means for mounting the valve for slidable and pivotal movements.

10. In an airship, a buoyant body having a longitudinal opening for the passage of air extending rearwardly from the front end of the body to the rear end thereof and having a rearwardly tapered portion, and valve means consisting of a plug located in the longitudinal opening and movable toward and from the rearwardly tapered portion thereof to control the amount of air passing through the longitudinal opening and to plug and close the same to form an air brake, said plug being also movable vertically and laterally to provide a passage for air at only the top, bottom, or either side of the longitudinal opening for guiding and controlling the direction of the airship.

11. In an airship, a buoyant body having a continuous longitudinal air passage extending entirely through it from one end to the other and provided with a terminal tapered portion, and valve means located at said tapered terminal portion and consisting of a plug arranged to close the air passage to form an air brake and movable vertically and laterally to provide an air passage at only the top, bottom or either side of said terminal tapered portion of the longitudinal passage for guiding and controlling the direction of the airship.

12. In an airship, a buoyant body having at the front a flaring entrance opening and provided with a continuous longitudinal passage extending rearwardly from the entrance opening through the body to the rear end thereof, and a front speed and direction control valve consisting of a plug located in the entrance opening and having a rear tapered portion to cooperate with the walls of the entrance opening to control the amount of air entering the longitudinal air passage and to plug and close the air passage to form an air brake, and also to provide an air inlet passage at only the top, bottom or either side of the front end of the body for guiding and controlling the direction of the airship, said plug being provided with a tapered front portion for dividing and deflecting the air entering the entrance opening, and means for mounting the plug for sliding and pivotal movements.

13. In an airship, a buoyant body having at the front an entrance opening and provided with a continuous longitudinal air passage extending rearwardly from the entrance opening through the body to the rear end of the same and having a rear outlet, valve means consisting of a plug located at the rear outlet and having a rear tapered portion to cooperate with the walls of the outlet and movable toward and from the same and toward and from the said rear outlet, to plug and close the air passage to form an air brake and to control the amount of air discharged from the longitudinal air passage and also to form an air passage only at the top, bottom or either side of the outlet, and means for mounting the valve for sliding and pivotal movements.

14. In an airship, a buoyant body having at the front an entrance opening and provided with a continuous longitudinal air passage extending rearwardly from the entrance opening through the body to the rear end of the same and provided with a rear outlet tapered rearwardly, a rear valve located within the longitudinal passage at said rear outlet and consisting of a plug having a tapered portion and movable longitudinally of the passage toward and from the rear outlet to control the amount of air discharged through the same and to plug the rear outlet to form an air brake and also movable vertically and laterally to provide an air passage at only the top, bottom or either side of the rear outlet for guiding and controlling the direction of the airship, and means for mounting the valve for sliidng and pivotal movements.

15. In an airship, a buoyant body having at the front an entrance opening and provided with a continuous longitudinal air passage extending rearwardly from the entrance opening through the body to the rear end of the same and provided with a rear outlet tapered rearwardly, a rear valve located within the longitudinal passage at said rear outlet and consisting of a plug having a tapered portion and movable longitudinally of the passage toward and from the rear outlet to control the amount of air discharged through the same and to plug the rear outlet to form an air brake and also movable vertically and laterally to provide an air passage at only the top, bottom or either side of the rear outlet for guiding and controlling the direction of the airship, and means for mounting the valve for sliding and pivotal movements, said valve being provided with a front tapered portion arranged to divide and deflect air passing through the longitudinal passage to the outlet.

16. In an airship, a buoyant body having a longitudinal air passage extending through the body from the front end thereof to the rear end of the same and provided with a front entrance opening and a rear outlet, front and rear valves consisting of plugs pivotally and slidably mounted for controlling the direction and speed and for plugging the ends of the longitudinal passage to form an interiorly arranged chamber for compressed air, a controlled air inlet located between said valves for admitting air to be compressed in said chamber, means for compressing air within the chamber and controlled air jet passages communicating with said chamber and arranged to discharge jets of air from the front of the body and radially from the top, bottom and sides of the body for moving the body upwardly, downwardly, rearwardly and laterally when the ends of the longitudinal passage are closed.

17. In an airship, a buoyant body having a longitudinal air passage extending through the body from the front end thereof to the rear end of the same and provided with a front entrance opening and a rear outlet, front and rear valves consisting of plugs pivotally and slidably mounted for controlling the direction and speed and for plugging the ends of the longitudinal passage to form an interiorly arranged chamber for compressed air, a controlled air inlet located between said valves for admitting air to be compressed in said chamber, means for compressing air within the chamber, said body being provided with stabilizer fins having controlled air jet passages communicating with said chamber whereby air under pressure will be supplied to said jet passages.

18. In an airship, a buoyant body having a longitudinal air passage extending through the body from the front end thereof to the rear end of the same and provided with a front entrance opening and a rear outlet, front and rear valves consisting of plugs pivotally and slidably mounted for controlling the direction and speed and for plugging the ends of the longitudinal passage to form an interiorly arranged chamber for compressed air, a controlled air inlet located between said valves for admitting air to be compressed in said chamber, means for compressing air within the chamber, said body being provided at the rear end with stabilizer fins having controlled air jet passages arranged to discharge air forwardly and rearwardly and communicating with said chamber whereby said air jet passages are supplied with compressed air.

19. In an airship, a buoyant body having a longitudinal air passage extending through the body from the front end thereof to the rear end of the same and provided with a front entrance opening and a rear outlet, front and rear valves consisting of plugs pivotally and slidably mounted for controlling the direction and speed and for plugging the ends of the longitudinal passage to form an interiorly arranged chamber for compressed air, a controlled air inlet located between said valves for admitting air to be compressed in said chamber, means for compressing air within the chamber, said body being provided with stabilizer fins having air jet passages arranged to discharge jets radially, forwardly and rearwardly, a plurality of rearwardly discharging air jets being provided for each stabilizer fin and being arranged in spaced relation, said air jet passages communicating with said chamber whereby the air jet passages are supplied with compressed air.

20. In an airship, a buoyant body having a continuous longitudinal air passage extending entirely through it from one end to the other and provided with a terminal tapered portion rectangular in cross section and presenting rearwardly converging plane surfaces at the top, bottom and sides of the body, and valve means located at said tapered terminal portion and consisting of a tapered plug rectangular in cross section arranged to close the air passage to form an air brake and movable vertically and laterally to provide an air passage at only the top, bottom or either side of said terminal tapered portion of the longitudinal passage for guiding and controlling the direction of the airship.

GREENHOW JOHNSTON.

REFERENCES CITED

The following references are of record in the file of this patent:

UNITED STATES PATENTS

| Number | Name | Date |
|---|---|---|
| 982,561 | Anway | Jan. 24, 1911 |
| 1,209,301 | Jander | Dec. 19, 1916 |
| 1,290,669 | Schmidt | Jan. 7, 1919 |
| 1,457,024 | Franzen | May 29, 1923 |
| 1,471,764 | Wheeler | Oct. 23, 1923 |
| 1,572,812 | Rees | Feb. 9, 1926 |
| 1,585,281 | Craddock | May 18, 1926 |
| 1,895,518 | Peck | Jan. 31, 1933 |
| 1,938,234 | Voorhees | Dec. 5, 1933 |
| 2,384,385 | Heintze | Aug. 21, 1945 |

FOREIGN PATENTS

| Number | Country | Date |
|---|---|---|
| 321,543 | Italy | Oct. 9, 1934 |
| 342,260 | Great Britain | Jan. 21, 1931 |
| 403,730 | France | Oct. 2, 1909 |